May 22, 1956 — J. C. PETREA — 2,746,707
FEED CONTROL MEANS FOR WEIGHING MACHINES
Filed Jan. 8, 1953 — 2 Sheets-Sheet 1

INVENTOR
James C. Petrea
BY Bacon & Thomas
ATTORNEYS

May 22, 1956     J. C. PETREA     2,746,707
FEED CONTROL MEANS FOR WEIGHING MACHINES
Filed Jan. 8, 1953     2 Sheets-Sheet 2
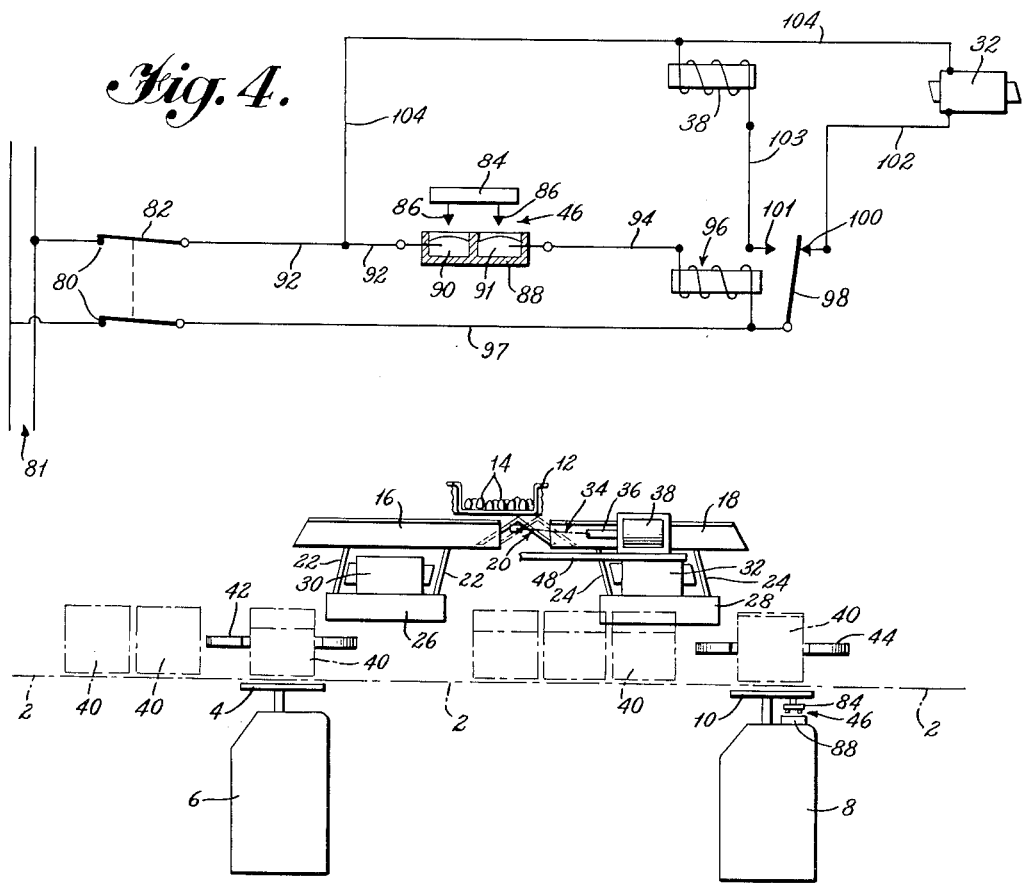
INVENTOR
James C. Petrea
BY Bacon & Thomas
ATTORNEYS United States Patent Office 2,746,707
Patented May 22, 1956

2,746,707

FEED CONTROL MEANS FOR WEIGHING MACHINES

James C. Petrea, Durham, N. C., assignor to Wright Machinery Company, Durham, N. C., a corporation of North Carolina Application January 8, 1953, Serial No. 330,188

9 Claims. (Cl. 249—59)

This invention relates to a feed control mechanism for weighing machines and is described in connection with a machine particularly designed to regulate the flow of material to a two-station candy weigher.

Basically, the weighing machine automatically fills rigid containers, such as cardboard boxes, with the proper weight of candy or the like and with the weighing and filling operation being divided into two stages. It is to be understood that while reference is made to candy specifically, any other material adapted to the type of control disclosed may be handled by a machine according to the present invention, the reference to candy being merely for the purpose of illustration.

At the first station the bulk of the candy, about 95% of the total weight of the package, is placed in the container while it rests on a bulk weighing unit. Since speed is more important than accuracy at this bulk weighing station, a heavy continuous flow of material is necessary. This heavy stream of material is supplied by a conveyor or oher material delivering means receiving material from a continuous stream supplied to the machine and delivering the same to the package on the bulk weighing unit.

When the first step of the weighing and filling has been completed at the bulk weighing station, the package remains slightly underweight. The machine then automatically conveys the partially filled container to the second or final weighing station, placing it on a final weighing unit. At this station, the final weighing station, the container receives the remainder of its net weight from a dribble feed conveyor and accuracy of weight is all-important at this station. To insure accuracy of weight, the candy or other material must be metered into the box piece by piece, or in a very fine stream. This necessitates a single-file feed of pieces along the dribble feed conveyor, which also receives its material from the continuous stream supplying the machine.

The conveyors supplying material to the two weighing stations are preferably electrically operated, although other conveyors may be employed, and a continuous feed is directed to the bulk weighing station while the conveyor feeding the container at the final weighing station is stopped upon attainment of the required final weight. To prevent "piling up" of material on the dribble feed conveyor during the periods when it is stopped, it is necessary that the supply of material to that conveyor from the principal supply stream also be interrupted. If such interruption is not accomplished substantially simultaneously with the stopping of the dribble feed conveyor, the single file arrangement of material on the dribble feed conveyor will be disturbed and the accuracy of control of the next cycle of final weighing will also be disturbed.

According to the present invention, a feed proportioning means is placed in the main stream of material flowing to the machine and is arranged to divide the stream so that a predetermined proportion goes to the bulk feed conveyor and the remainder of the stream to the dribble feed conveyor. That portion of the stream of material going to the dribble feed conveyor is preferably just sufficient to form a single file arrangement of pieces (or its equivalent) on the dribble feed conveyor.

Means connected to the final weighing unit become effective upon attainment of final weight to automatically stop the dribble feed conveyor and to substantially simultaneously shift the feed proportioning means to a position where the entire main stream of material goes to the bulk feed conveyor. The machine then automatically removes the filled container from the final weighing unit and replaces it with a partially filled container from the bulk weighing unit. The final weighing unit then automatically starts the dribble feed conveyor on another cycle of operation and at the same time moves the feed proportioning means back into the main stream of material to again divide the stream so that the proper proportion of material goes from the main stream to the dribble feed conveyor for another cycle of operation.

It is, therefore, an object of this invention to provide an improved feed control means for effecting abrupt stopping of the feed from a conveyor without "piling up" of material thereon during periods when the conveyor is stopped.

Another object of this invention is to provide an improved arrangement for feeding and weighing material at high speed and with a high degree of accuracy.

Still another object of this invention is to provide a simple automatically controlled means for controlling material feed.

A still further object of this invention is to provide a feed control means for a weighing mechanism to effect a positive and abrupt stopping of a dribble feed mechanism and simultaneously stopping the deposit of material on that dribble feed mechanism upon making of final weight in the container being filled.

Still further objects and advantages will appear to those skilled in the art as the description proceeds in connection with the accompanying drawings, wherein:

Fig. 3 is a sectional view of the feed control mechanism taken substantially along the line 3—3 of Fig. 1;

Fig. 4 is a circuit diagram of the electrical control means for the feed control mechanism of the present invention; and Fig. 5 is a diagrammatic representation of a possible arrangement of the entire weighing and feed control mechanism, illustrating the relationship of the conveyors and weighing units.

Figure 1:
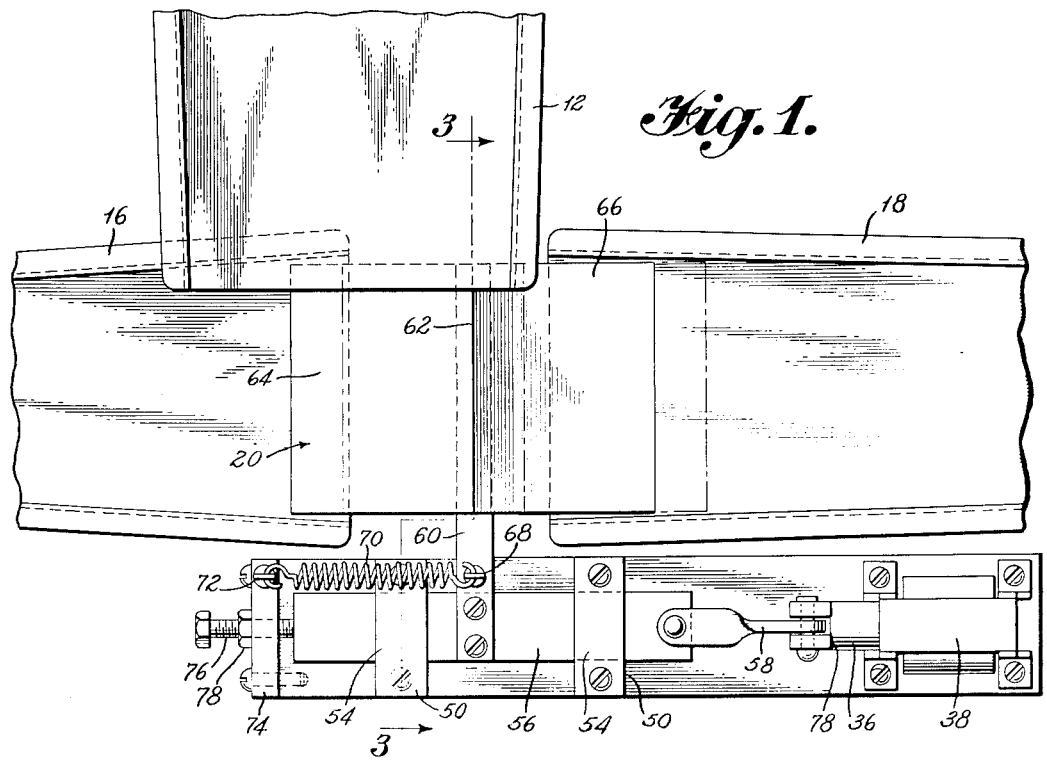
Fig. 1 is a top plan view of one embodiment of feed control mechanism constructed in accordance with the present invention.

Referring first to Fig. 5, suitable conveyor means or equivalent mechanisms (not shown) are provided for effecting movement of containers along a path indicated by the broken line 2. The path of movement of the containers extends over the weighing platform 4 of a bulk weighing unit 6, defining a bulk weighing station. A second, or final, weighing unit 2 defines a final weighing station and has a movable weighing platform 10 arranged in the path 2 of the containers. A supply conveyor 12 furnishes a continuous stream of material, such as candy pieces 14, for instance, to the weighing machine and is arranged with its delivery end adjacent the material receiving ends of bulk feed conveyor 16 and dribble feed conveyor 18.

A tent-like or inverted V-shaped structure 20 is arranged with its apex or ridge adjacent the delivery end of the conveyor 12 and acts as a stream proportioning means to direct a part of the material delivered by the conveyor 12 onto bulk feed conveyor 16 and to direct the remainder of the material to the dribble feed conveyor 18. As shown, the proportioning means 20 (in full line position) so divides the stream of material delivered by conveyor 12 that all but a single row of candy pieces is directed to the bulk feed conveyor and the single row itself is directed to the dribble feed conveyor 18. Each of the conveyors 16 and 18 is preferably of the vibratory type, consisting of an upper material holding and conveying trough supported by spring members 22 and 24, respectively, carried by a suitable fixed base 26 or 28, each of which is fixedly mounted on the frame of the machine (not shown). Electromagnetic vibrating means 30 and 32 are arranged to effect vibration of the conveyors 16 and 18 in the direction of material flow, in a well-known manner. Clearly, any other equivalent or suitable type of conveyor could be used for 16 or 18, or both.

The material proportioning means 20 is slidably mounted on the frame of the machine and is connected, by means suggested by line 34, to the movable armature 36 of a solenoid 38 fixedly mounted on the machine frame. When the solenoid 38 is energized it acts through the means 34 and 36 to move the feed proportioning means 20 to the right to the position shown in dotted lines. When in this position, it is obvious that the feed proportioning means deflects the entire stream of material from the conveyor 12 to the bulk feed conveyor 16. When the solenoid 38 is de-energized, a spring (not shown in Fig. 5) returns the feed proportioning means 20 to the full line position.

Numeral 40 indicates containers being fed through the machine and being filled with the required weight of material at the weighing stations. Empty containers entering the machine from the left are controlled by a suitable control mechanism, schematically shown at 42, to be successively placed on the platform 4 of the bulk weighing unit 6 and there to receive material from the bulk feed conveyor 16 until the required bulk weight has been achieved. Upon deposit of the required amount of material in a container on the platform 4, the control means 42 is automatically operated in any well-known manner to remove the partially filled container from the platform 4 and direct it toward the final weighing station and to position an empty container on that platform. Suitable hopper or baffle means may be provided to prevent "spilling" of material during that transfer of containers, it being remembered that conveyor 16 delivers a continuous stream of material. If desired, material catching means may be interposed between conveyor 16 and platform 4 to catch and accumulate material during the period of container transfer. Such catching means would then dump its accumulated material into the succeeding empty container when the latter is in position on platform 4.

In like manner, a suitable control member, such as a star wheel, shown schematically at 44 is arranged to successively position partially filled containers on the platform 10 of the final weighing unit 8 and to automatically remove completely filled containers therefrom after final weight has been made, and to position a succeeding partially filled container thereon. The means for controlling operation of control member 44 includes a switch 46 on final weighing unit 8. The switch 46 closes an electrical circuit when the platform 10 has moved downwardly a distance corresponding to the attainment of final weight in the container on that platform. When the switch 46 closes the circuit referred to, means to be described hereafter interrupt current supplied to the electromagnetic vibrating means 32 for the dribble feed conveyor 18 and thus abruptly stop the conveyor 18. Simultaneously, the circuit to solenoid 38 is closed, thus energizing the solenoid 38 and effecting movement of feed proportioning means 20 to the dotted line position.

Thus, as soon as final weight is made in a container on the platform 10, the dribble feed conveyor is abruptly stopped and deposit of material on that conveyor from conveyor 12 is simultaneously stopped so there is no dribble feed during the interval of time during which the filled container is being removed from the platform 10 and a succeeding partially filled container is placed thereon.

The means and arrangement for actuating and controlling the operation of the container transferring mechanisms 42 and 44 and the details of those mechanisms are not described herein but may be of any well-known type or arrangement responding to movement of the associated weighing platform.

Figure 2:
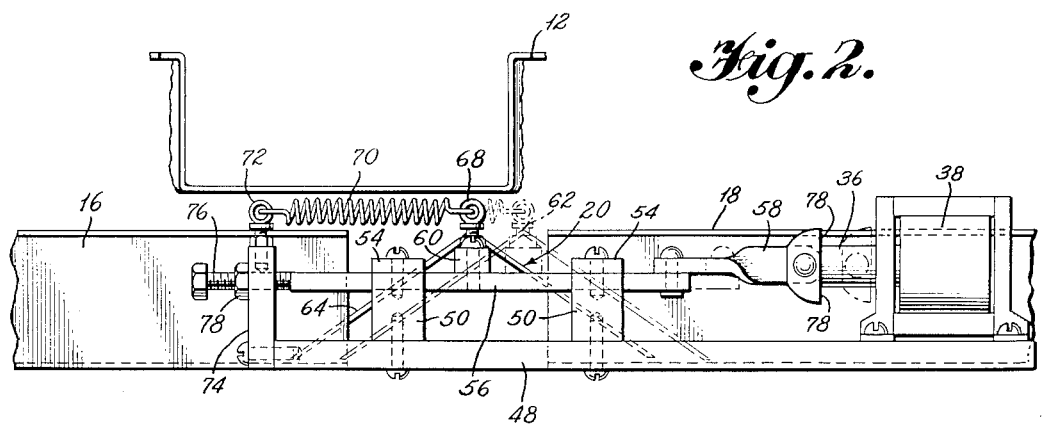
Fig. 2 is a front elevational view of the mechanism shown in Fig. 1.

Referring now to Figs. 1 to 3, the conveyor 12 supplying the main stream of material to the machine is shown as a trough-like structure and is preferably a vibratory conveyor of usual construction but may be an endless belt type or any other suitable means. The stream of material may, in fact, be furnished by a simple chute extending from a supply hopper, it only being necessary that the stream follow a predetermined path at the proportioning station. The bulk feed conveyor 16 is preferably arranged with its receiving end positioned below substantially the mid-portion of the end of supply conveyor 12, whereas the dribble feed conveyor is preferably positioned with its receiving end adjacent but outwardly of the delivery end of supply conveyor 12, as clearly shown in Figs. 1 and 2. As illustrated, the bulk feed conveyor 16 and the dribble feed conveyor 18 extend at substantially right angles to the direction of feed from the supply conveyor 12 and are in substantial axial alignment with each other. This exact arrangement is not critical, however, since conveyors 16 and 18 may be arranged in angular relationship to each other and at an oblique angle to the direction of feed from conveyor 12. The receiving ends of conveyors 16 and 18 are preferably spaced apart a substantial distance, as shown. Adjacent the conveyors 16 and 18 and fixed to the machine frame (not shown) is a supporting structure 48 on which solenoid 38 is mounted. The structure 48 also fixedly supports suitable guide blocks 50 having aligned grooves 52 (see Fig. 3) in their upper surfaces and cover plates 54 overlying the grooves 52. A slide bar 56 is slidably received in the aligned grooves 52 for sliding movement in a direction substantially parallel to the line of feed of the conveyors 16 and 18. The slide bar 56 constitutes a part of the connecting mechanism identified by numeral 34 in Fig. 5. A suitable link 58 connects one end of the slide bar 56 to the armature 36 of solenoid 38. A transverse bar 60 is fixed to the slide bar 56 and extends into the space between the receiving ends of conveyors 16 and 18. The material proportioning means 20 consists of an inverted V-shaped structure having an apex or ridge 62 defined by the upper termination of downwardly diverging surfaces 64 and 66. The transverse bar 60, carried by slide bar 56, extends under and immediately below the apex or ridge portion 62 of the proportioning means 20 and the latter is fixed to the bar 60 by any suitable means to be rigid therewith. The lower terminuses of the surfaces 64 and 66 overlie the bottoms of the conveyors 16 and 18, respectively, in either position of the feed proportioning means 20, but are slightly spaced therefrom. As suggested in the drawings, the feed proportioning means 20 may comprise a sheet of metal or the like bent to the inverted V-shape shown. The width of the feed proportioning means 20 is preferably only slightly less than the inside width of the troughs of conveyors 16 and 18.

From the arrangement thus far described, it will be obvious that material being delivered by the conveyor 12 and dropping from the delivery end thereof will fall along a predetermined path on the feed proportioning means 20 and be divided thereby in the manner previously set forth.

The transverse bar 60 is also provided with an eyelet 68 to which one end of a tension spring 70 is attached. The other end of tension spring 70 engages an eyelet 72 carried by a post 74 mounted on the supporting structure 48. The post 74 is also provided with a threaded opening in line with an end of slide bar 56 and a threaded stop bolt 76 threadedly engages the threaded opening in post 74. Preferably the stop bolt 76 is also provided with a lock nut 78. The spring 70 urges the slide bar 56 to the left hand or full line position shown in Fig. 2, in which the left hand end of bar 56 engages the stop bolt 76. The stop bolt 76 may be adjusted so that spring 70 will position apex 62 in such a location that a single row or suitably fine stream of whatever material is being fed to the machine will fall on the surface 66 and be directed to the dribble feed conveyor 18. When the solenoid 38 is energized, the slide bar 56 is moved to the right against the tension of spring 70 until shoulders 78 on armature 36 engage the solenoid frame in which position the apex 62 is outwardly of the delivery end of conveyor 12 and all of the material being supplied to the machine falls on surface 64 and is directed to the bulk feed conveyor 16.

Fig. 4 illustrates a wiring diagram by which the various mechanisms described may be controlled in the desired manner. Terminals 80 represent terminals to be connected respectively to the conductors of an electrical supply line 81. A double pole switch 82, comprising the main control switch for the mechanism, may be arranged to supply or deny electric current to the control circuit. The switch 46 may consist of a movable member 84 carried by the weighing platform of final weighing unit 8 and is constituted by a conductor having a pair of spaced contact elements 86. The switch 46 also includes a container means 88 of insulating material provided with suitable compartments for separated pools of mercury 90 and 91. A conductor 92 extends from one side of the switch 82 into the pool 90 of mercury. A conductor 94 connects the other pool of mercury 91 to the windings of a relay 96, the other terminal of which is connected by a conductor 97 to the other side of main switch 82. Also connected to the said other terminal of the relay 96 is a switch blade 98 pivotally mounted to make contact with either of two contact points 100 or 101. A suitable spring or the like (not shown) holds the switch blade 98 normally in contact with contact point 100. A conductor 102 extends from the contact point 100 to a terminal of the electromagnetic vibrating means 32 for the dribble feed conveyor 18. A conductor 103 connects the contact point 101 to one end of the coil of solenoid 38. The other end of the coil of solenoid 38 is connected to a conductor 104 which extends from the other terminal of the electromagnetic vibrating means 32 for the dribble feed conveyor 18 to the conductor 92. Conductor 104 is connected to conductor 92 at a point between switch 46 and switch 82. The circuit shown in Fig. 4 is in the condition it assumes while a container on the platform 10 of final weighing unit 8 contains less than the required weight of material. In this condition, assuming main switch 82 to be closed, current is supplied from line 81 to the electromagnetic vibrating means 32 for dribble feed conveyor 18 through conductor 97, switch blade 98, contact point 100, and conductor 102. The return circuit from the electromagnetic vibrator 32 is along conductor 104 to conductor 92 and then through switch 82 to the line 81. When the required final weight of material has been deposited in the container on platform 10, the platform moves downwardly sufficiently to engage contact elements 86 with their respective pools of mercury 90 and 91 and thus complete a circuit through the coil of relay 96. When the relay 96 is thus energized, the switch blade 98 is moved away from contact point 100 and into engagement with contact point 101. In moving away from contact point 100, the switch blade 98 breaks the circuit to the electromagnetic vibrating means 32 and the dribble feed conveyor 18 is thus immediately stopped, with an immediate stopping of the deposit of material in the container.

At the instant switch blade 98 engages contact point 101, a circuit is completed through the coil of solenoid 38 and the feed proportioning means 20 is thus promptly moved to the dotted line position of Figs. 2 and 5, and no more material is deposited on the now stationary dribble feed conveyor 18. The dribble feed conveyor thus remains stationary as long as the weighing platform 10 is in its lowermost position. As soon as the filled container is moved from the platform 10 and a partially filled container placed thereon, the platform 10 assumes an upper position in which the contact elements 86 are above the pools of mercury 90 and 91 and the circuit to the relay 96 is thus opened. The usual spring (not shown) returns switch blade 98 to the position of Fig. 4, where it engages contact point 100 and the solenoid 38 is simultaneously de-energized. Thus, normal feed by the dribble feed conveyor 18 is resumed for another cycle of operation. If desired, suitable means may be provided to positively hold platform 10 in its lower position, and thus hold switch 46 closed, until the operation of removing the filled container from platform 10 and positioning of the next partially filled container thereon has been completed.

While a single specific embodiment of the invention has been shown and described, it is to be understood that many other modifications may be resorted to. For instance, the bulk feed conveyor 16 may be extended to the right as seen in Fig. 2 sufficiently far to underlie the entire delivery end of main conveyor 12 and that portion of the proportioning means defining surface 64 may be completely eliminated. Thus the surface 66 will divert a portion of the main stream to the dribble feed conveyor 18 when in the position corresponding to that shown in Fig. 2 but when moved to the right to a position corresponding to that shown in dotted lines all of the material from conveyor 12 will fall directly on the bulk feed conveyor 16 and no surface such as 64 would be necessary. As a further obvious modification, the bulk feed conveyor 16 could be extended to underlie the entire delivery and of the main conveyor 12 and the surface 66 could be a portion of a single plate pivoted about its lowermost edge to swing from a position corresponding to that shown in full lines in Fig. 2 to a position where the upper edge of the plate is entirely outside the main stream of material which thus would fall on the bulk feed conveyor 16.

As used herein, and particularly in the claims appearing hereafter, the term "conveyor" is intended to include such conveyors as specifically described or their equivalents in function and, in some instances, may even include mere chutes functioning only as guide means to guide material being advanced by gravity.

I claim:

1. Feed control means comprising: means for directing a uniform continuous stream of material to be weighed along a predetermined path, a bulk feed conveyor arranged to receive material from said stream, a dribble feed conveyor, material proportioning means having a stream dividing portion arranged within said predetermined path for movement to a first position with said stream dividing portion to divide said stream and divert a predetermined fraction of said stream from said path to said dribble feed conveyor, means normally holding said proportioning means stationary in said first position, and means for moving said proportioning means to a second position wherein said dividing portion is outside said path to direct none of said stream to said dribble feed conveyor.

2. Feed control means as defined in claim 1, wherein said proportioning means is spring-urged to said first position, and adjustable stop means for limiting movement of said proportioning means and fixing said first position whereby to regulate the proportion of said stream diverted to said dribble feed conveyor.

3. Feed control means for a weighing machine, comprising: means for directing a uniform continuous stream of material to be weighed along a predetermined path, a bulk feed conveyor arranged to receive material from said stream and deliver said material to a container to partially fill the same, a dribble feed conveyor arranged to deliver material from said stream to a partially filled container on a weighing platform, material proportioning means arranged for movement to a first position to direct only a portion of said stream from said path to said dribble feed conveyor, means normally holding said proportioning means stationary in said first position, and means for abruptly moving said proportioning means to a second position to direct none of said stream to said dribble feed conveyor, said means for moving said proportioning means being controlled by movement of said weighing platform to a predetermined position by the weight of material in said container.

4. Feed control means as defined in claim 3, including driving means for said dribble feed conveyor, and means for stopping said dribble feed conveyor substantially simultaneously with movement of said proportioning means to said second position.

5. Feed control means as defined in claim 3, including electrical driving means for said dribble feed conveyor, said means for moving said proportioning means to said second position comprising a solenoid, and circuit control means actuated by movement of said weighing platform to a predetermined position for substantially simultaneously energizing said solenoid and de-energizing said electrical driving means.

6. Feed control means as defined in claim 5, including a spring for moving said proportioning means to said first position, and adjustable stop means for limiting movement of said proportioning means by said spring and thereby fixing said first position whereby to regulate the proportion of said stream directed to said dribble feed conveyor.

7. Feed control means for a weighing machine, comprising: means defining a first weighing station including bulk weighing mechanism, bulk feeding means for continuously feeding material to a container on said bulk weighing mechanism, means for successively placing empty containers on said bulk weighing mechanism and removing partially filled containers therefrom upon deposit of a predetermined bulk weight of material therein, means defining a second weighing station including a final weighing mechanism, means for successively placing said partially filled containers on said final weighing mechanism and for removing filled containers therefrom upon deposit of sufficient additional material therein to achieve a predetermined final weight, dribble feeding means for feeding a dribble stream of material to a container on said final weighing mechanism, means for actuating said dribble feeding means, means for supplying a continuous stream of material to said weighing machine along a predetermined path, material proportioning means normally stationary in a first position in said path and arranged to direct a predetermined proportion of said stream to said dribble feeding means, said bulk feeding means being arranged to receive the rest of said stream, means actuated by said final weighing mechanism upon deposit of said predetermined final weight of material in a container thereon to substantially simultaneously stop the actuation of said dribble feeding means and move said proportioning means to a second position to direct none of said stream to said dribble feeding means, and means for moving said proportioning means back to said first position upon movement of a succeeding partially filled container onto said final weighing mechanism.

8. Feed control means comprising: means for directing a continuous stream of material along a predetermined path, first and second conveyors arranged with their material receiving ends adjacent said path, means for driving said conveyors to move material away from said path, proportioning means having a surface terminating in an edge, said proportioning means being movably mounted to be placed in a first position with said edge within said path or in a second position with said edge outside said path, and means normally holding said proportioning means stationary in said first position, said surface being so arranged when said proportioning means is in said first position, as to direct only a predetermined portion of said stream to said first conveyor, the rest of said stream being delivered to said second conveyor, and means for substantially simultaneously stopping the drive of said first conveyor and moving said proportioning means to said second position whereby to direct none of said stream of material to said first conveyor.

9. Feed control means as defined in claim 8, wherein said proportioning means comprises a V-shaped structure having a second surface terminating at said edge, the other edges of said surfaces opposite said edge being arranged to always overlie said first and second conveyors, respectively, and said structure being mounted for sliding movement in a direction transverse to said path.

References Cited in the file of this patent
UNITED STATES PATENTS

| | | |
|---|---|---|
| 628,894 | Outcalt | July 11, 1899 |
| 1,434,937 | Watts | Nov. 7, 1922 |
| 1,519,613 | Hazard | Dec. 16, 1924 |
| 2,022,659 | Fisher | Dec. 3, 1935 |
| 2,139,903 | Mason et al. | Dec. 13, 1938 |
| 2,170,249 | Misner | Aug. 22, 1939 |
| 2,371,040 | Fisher | Mar. 6, 1945 |
| 2,626,042 | Aldridge | Jan. 20, 1953 |
| 2,634,082 | Knobel | Apr. 7, 1953 |
| 2,669,412 | Nowak | Feb. 16, 1954 |